(12) United States Patent
Parris

(10) Patent No.: US 6,374,023 B1
(45) Date of Patent: Apr. 16, 2002

(54) COMMUNICATION CABLE CONTAINING NOVEL FILLING MATERIAL IN BUFFER TUBE

(75) Inventor: Donald R. Parris, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/322,625

(22) Filed: May 28, 1999

(51) Int. Cl.[7] .................................................. G02B 6/94
(52) U.S. Cl. ........................ 385/109; 385/100; 385/114; 523/173
(58) Field of Search ................................ 385/100, 102, 385/105, 109, 110, 112, 114, 141; 523/173

(56) References Cited

U.S. PATENT DOCUMENTS

| | | | |
|---|---|---|---|
| 3,607,487 A | 9/1971 | Biskeborn et al. ............. 156/47 |
| 3,711,262 A | 1/1973 | Keck et al. ...................... 65/3 |
| 3,717,716 A | 2/1973 | Biskeborn et al. ........ 174/25 R |
| 3,843,568 A | 10/1974 | Woodland et al. ........ 260/2.5 B |
| 3,879,575 A | 4/1975 | Dobbin et al. ................. 174/92 |
| 3,884,550 A | 5/1975 | Maurer et al. ................. 350/96 |
| 4,176,240 A | 11/1979 | Sabia ........................ 174/23 C |
| 4,279,470 A | 7/1981 | Portinari et al. ......... 350/96.23 |
| 4,351,913 A | * 9/1982 | Patel ............................ 523/218 |
| 4,464,013 A | 8/1984 | Sabia ....................... 350/96.23 |
| 4,497,538 A | 2/1985 | Patel ........................ 350/96.23 |
| 4,509,821 A | 4/1985 | Stenger ..................... 350/96.23 |
| 4,701,016 A | 10/1987 | Gartside, III et al. .... 350/96.23 |
| 4,705,571 A | 11/1987 | Lange et al. ............. 106/287.1 |
| 4,723,831 A | 2/1988 | Johnson et al. .......... 350/96.23 |
| 4,730,894 A | 3/1988 | Arroyo ..................... 350/96.23 |
| 4,763,982 A | 8/1988 | Greveling ................. 350/96.23 |
| 4,770,489 A | 9/1988 | Saito et al. ............... 350/96.23 |
| 4,776,910 A | 10/1988 | Taylor et al. ................ 156/145 |
| 4,798,853 A | 1/1989 | Handlin, Jr. ................. 523/173 |
| 4,810,395 A | 3/1989 | Levy et al. ..................... 252/28 |
| 4,818,060 A | 4/1989 | Arroyo ..................... 350/96.23 |
| 4,822,133 A | 4/1989 | Peacock .................. 350/96.23 |
| 4,826,278 A | 5/1989 | Gartside, III et al. .... 350/96.23 |
| 4,844,575 A | 7/1989 | Kinard et al. ............ 350/96.23 |
| 4,942,270 A | 7/1990 | Gamarra ........................ 174/93 |
| 5,049,593 A | * 9/1991 | Marciano-Agostinelli ... 523/173 |
| 5,149,736 A | 9/1992 | Gamarra ..................... 524/490 |
| 5,224,192 A | 6/1993 | Wagman ..................... 385/112 |
| 5,262,468 A | * 11/1993 | Chen .......................... 524/476 |
| 5,343,549 A | 8/1994 | Nave et al. .................. 385/103 |
| 5,657,410 A | 8/1997 | Fehn et al. ................. 385/102 |
| 5,671,312 A | 9/1997 | Jamet ......................... 385/100 |
| 5,698,615 A | 12/1997 | Polle ........................ 523/173 |
| 5,737,469 A | 4/1998 | Costello et al. ............. 385/109 |
| 5,911,023 A | * 6/1999 | Risch et al. ................ 385/100 |
| 5,994,450 A | * 11/1999 | Pearce ........................ 524/505 |
| 6,041,153 A | * 3/2000 | Yang ........................ 385/100 |
| 6,178,278 B1 | 1/2001 | Keller et al. ................ 385/109 |
| 6,253,012 B1 | 6/2001 | Keller et al. ................ 385/109 |

FOREIGN PATENT DOCUMENTS

WO    WO 97/22028    6/1997    ............ G02B/6/44

* cited by examiner

Primary Examiner—Hemang Sanghavi
Assistant Examiner—Omar Rojas, Jr.
(74) Attorney, Agent, or Firm—Timothy J. Aberle

(57) ABSTRACT

A cable containing at least one optical fiber within a tube, a space between the optical fiber and the tube and a filling material at least partially filling the space. The filling material contains thermoplastic polymeric molecules which have bonded to form a three-dimensional network substantially throughout said filling material.

68 Claims, 3 Drawing Sheets

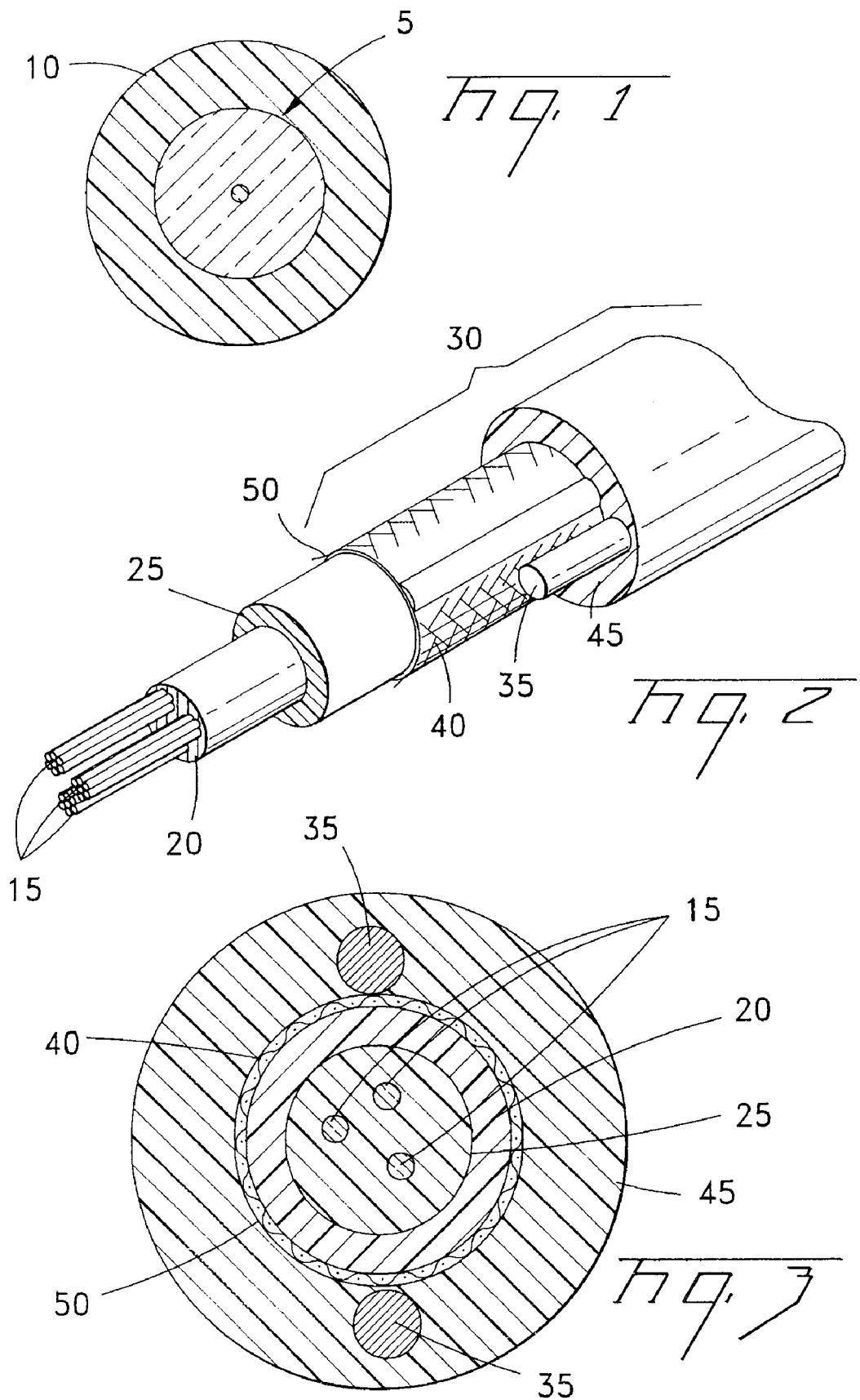

COMMUNICATION CABLE CONTAINING NOVEL FILLING MATERIAL IN BUFFER TUBE

BACKGROUND OF THE INVENTION

1. Field of the Invention

The present invention relates to communication cables containing at least one optical fiber within a tube, a space between the optical fiber and the tube being at least partially filled by a filling material.

2. Background of the Disclosure

Three general types of protective coatings have been recognized in the optical cable art: 1) loose tube buffers, 2) tight buffers and 3) composite buffers. See Mahlke, G. and Gossing, P., *Fiber Optic Cables*, John Wiley and Sons Limited, New York, 1987, pp. 96–108. Other specialized constructions have also been developed. See, for example, Saito et al., U.S. Pat. No. 4,770,489, which discusses the use of a grooved spacer core to carry a group of fibers, wherein the grooves are filled with a soft jelly-like material, the spacer is surrounded with a layer of aramid fiber, and the aramid fiber is surrounded by a plastic jacket. Filling compounds and flooding compounds are used within cables to block the flow of water therein but they are not wholly interchangeable. Filling compounds are suitable for contact with fibers and must not include a base composition or additives that result in unacceptable levels of optical performance changes.

Flooding compounds, on the other hand, typically include ingredients that render them unsuitable for contact with optical fibers. Generally filling compounds will be located in a tube having at least one optical fiber, and flooding compounds will be located exteriorly of the tube.

In the loose tube construction, one or more fibers are surrounded by a protective tube, typically referred to as a core or buffer tube, which is spaced from the fiber(s) by a distance sufficient to allow the fiber(s) to move within the core or buffer tube in response to applied stresses. By placing the fiber loosely in a tube, the fiber is substantially decoupled from the rest of the cable. Typically, the space between the fiber(s) and the loose tube is filled with a filling material, e.g., a grease or a thixotropic gel, so as to inhibit or prevent water migration in the tube and/or to protect the fiber(s) from water absorption.

Greveling, U.S. Pat. No. 4,763,982, discloses a cable comprising: 1) an outer jacket and 2) an inner tube composed of strength members, such as aramid fibers, embedded in resin carrier, the inner tube being filled with a thixotropic water blocking medium. Peacock, U.S. Pat. No. 4,822,133, discloses the use of water blocking grease used as a filling material in a tube. Other filling materials have included petroleum jelly mixed with a polymer, usually polyethylene, as described by Biskeborn et al, U.S. Pat. Nos. 3,607,487 and 3,717,716. Other filling materials have included a low viscosity oil thickened by a styrene-isoprene-styrene copolymer, again with polyethylene added to impart consistency and reduce slump; see, for example, Dobbin et al., U.S. Pat. No. 3,879,575.

Sabia, U.S. Pat. No. 4,464,013, describes the use of a mixture of (1) from 85 to 94 percent by weight of ASTM Type 103, 104A, or 104B, or mixtures thereof, naphthenic or paraffinic oil having a minimum specific gravity of 0.855; a minimum SUS viscosity at 210° F. of 40; a maximum pour point ASTMD 97 of less than −5° F.; and a maximum of 5 percent aromatic oils; and (2) from 6 to 15 percent by weight of a styrene-ethylene butylene-styrene block copolymer having a styrene-rubber ratio of from approximately 0.2 to 0.5. These two ingredients comprise substantially 100 percent of the filling material, but with up to 1 weight percent of the filling material being stabilizer.

Patel, U.S. Pat. No. 4,497,538, proposes the use of a mixture of a block copolymer, petroleum and an additive. The block copolymer is a styrene-ethylene butylene-styrene (SEBS) having a styrene to rubber ratio of 0.39 to 0.41, and a specific gravity of approximately 0.91. The petroleum is a mixture of microcrystalline waxes and oil that contains a small amount of an antioxidant additive. The additive is a low molecular weight polyethylene having a molecular weight range from 1,000 to 10,000 and a specific gravity of at least 0.90.

A major component of the foregoing filling compositions is a petroleum based filling composition, for example, an oil, grease, or wax that has been mixed with minor amounts of one or more organic and/or inorganic compounds. Such petroleum based filling compositions are relatively expensive, require special blending and are not suitable for use all cable components. For example, not all plastics commonly used for cable components are adequately resistant to the petroleum based composition.

Another disadvantage of petroleum based filling compositions is that they may not be suitable in all environments. For example, a base petroleum composition may not form a network of molecular bonds that sufficiently reduces flow under normal cable use environments. As a result, petroleum based compositions are often messy, particularly for those working with the cable in the field. Moreover, known filling compositions are susceptible to dripping at high temperatures, and undesirably high optical performance losses at lower operating temperatures.

Accordingly, there is a need in the art for filling materials that, for example, are not as messy as petroleum based compositions, avoid dripping at high temperatures, and otherwise minimize optical performance losses.

SUMMARY OF THE PREFERRED EMBODIMENTS OF THE DISCLOSURE

Accordingly, the present invention relates to a cable containing at least one optical fiber within a core or buffer tube, a space between the optical fiber and the tube, and a filling material at least partially filling the space.

It is an object of the invention to provide an alternative to the petroleum based filling materials conventionally used in the art by providing a filling material that comprises a three-dimensional molecular network thermoplastic polymer that have bonded through crystallization, intermolecular hydrogen bonding and/or intermolecular polar attraction of functional groups and not necessarily through covalent crosslinking. The three dimensional network of thermoplastic polymer, optionally including various additives, desirably possesses suitable properties under service conditions such that temperature change does not cause large compressive strain on the fibers, desirably possesses a low modulus thereby minimizing the resulting strain on the optical fiber, inhibits dripping at high temperatures and is inexpensive.

It is a further object of the invention to provide an alternative to the petroleum based filling materials which possesses other desirable characteristics. For example, the thermoplastic filling material desirably does not slump excessively at elevated service temperatures, so that the material will not migrate out of the end of the tube. Further, the thermoplastic filling material is desirably not excessively oily or greasy, is not messy, and desirably has a soft-rubber texture allowing for convenient handling during cable repair and other operations.

It is a further object of the invention to provide an alternative to the petroleum based filling materials which is easily manufactured and incorporated in a tube. The thermoplastic material desirably possesses a melt flow at temperatures over about 80° C., preferably between about 90° C. and about 125° C., yet remains sufficiently soft at temperatures as low as about −50° C. so as not to cause excessive optical attenuation. By use of the thermoplastic material, slicing of the tube may be employed for ease of cable manufacture without the ordinary dripping considerations.

It is a further object of the invention to provide filling material with a three-dimensional network that may include controlled amounts of any or substantial amounts of petroleum based oils, greases and waxes, and can exclude additives often employed with the oils, greases and waxes. Additives that may be excluded from the filling material of the invention include fumed silica and other silica products. However, superabsorbent materials such as hydrophilic polymers and other stabilizers often used with conventional petroleum based filling materials may be desirable for use with the present invention.

It is a further object of the invention to provide an alternative to the petroleum based filling materials which may include a foam. In this embodiment, the three dimensional network of thermoplastic polymer includes a foam incorporated therein by conventional means. These means include, for example, injection of gas into the thermoplastic polymer, adding materials to the thermoplastic polymer which split off a gas when heated, dissolving a gas in the thermoplastic material under pressure, adding microspheres, as well as other mechanical and chemical means.

BRIEF DESCRIPTION OF THE DRAWINGS

FIG. 1 is a cross-sectional view of an optical fiber according to one embodiment of the invention;

FIG. 2 is a perspective view of a communication cable according to one embodiment of the invention;

FIG. 3 is a cross-sectional view of a communication cable according to FIG. 2;

DETAILED DESCRIPTION OF THE PREFERRED EMBODIMENTS OF THE DISCLOSURE

Figure 4:
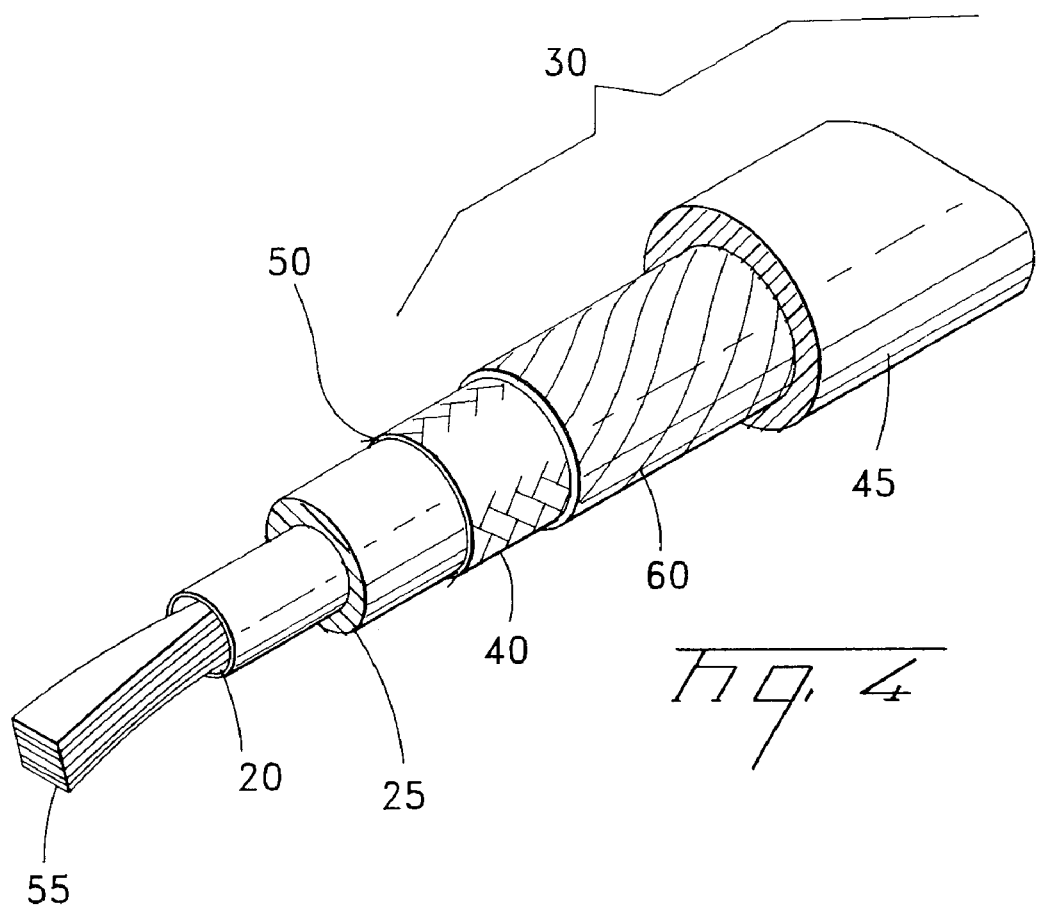
FIG. 4 is a perspective view of a communication cable according to another embodiment of the invention.

The principles of the invention apply to various optical cable designs, for example, optical communication cables comprising at least one optical fiber, and composite cables including at least one optical fiber and an electrical conductor, wherein a filling material at least partially fills the space between the optical fiber and a tube.

In general, the communication cables of the present invention can include three basic elements: at least one optical fiber, a tube, and a filling material at least partially filling the space between the at least one optical fiber and the tube. Other structures and components described herein may or may not be incorporated into the communication cables of the present invention. Such other structures and components, as described herein, are provided merely as part of possible embodiments of the invention and their description is in no way limiting of the invention.

The communication cables of the present invention include at least one optical fiber, for example, a single-mode, multi-mode or multi-core silica-based optical fiber. As depicted in FIG. 1, each optical fiber includes a core 5 and one or more coatings 10. It should be understood that herein the phrase "optical fiber" refers to the fiber itself and any coatings applied thereto.

At least partially surrounding the optical fiber is a filling material according to the present invention that comprises a three-dimensional polymeric network of molecules of a thermoplastic polymer that have bonded through crystallization, intermolecular hydrogen bonding and/or intermolecular polar attraction of functional groups and not necessarily through covalent crosslinking. As used herein, "a three-dimensional polymeric network of a thermoplastic polymer" means molecules of a thermoplastic polymer which are bonded at its ends to other thermoplastic polymer of like or unlike molecular units to form a soft but solid three-dimensional network of polymer connected through one or more of the above-mentioned bonds.

The three-dimensional network of thermoplastic polymer, optionally including various additives, desirably possesses suitable properties under severe conditions such that temperature change does not cause large compressive strain on the fibers, and desirably possesses a low modulus thereby minimizing the resulting strain on the optical fiber, and inhibits dripping at high temperatures.

The filling materials of the present invention provide an alternative to conventional, petroleum based filling materials. For example, the filling materials of the present invention desirably do not slump excessively at elevated service temperature, so that it will resist migrating out of the end of the tube. Further, the thermoplastic filling material is desirably not excessively oily or greasy, and desirably has a soft rubber texture allowing for convenient handling during cable repair and other operations. Moreover, by use of the thermoplastic material, slicing of the tube may be employed for ease of cable manufacture without ordinary dripping considerations.

Flooding compounds are well-known in the art and should not be confused with the filling materials of the present invention. The filling compounds of the invention are found within the core or buffer tubes, whereas the flooding compounds are outside of the tubes. As a result of the differences in the proximity/contact of the filling compounds and the flooding compounds to the optical fiber, the materials generally differ. However, it is contemplated herein that certain filling materials will likewise be useful as a flooding compound.

Preferred thermoplastic polymers for use in the filling material include those that will allow the filling material to have a Shore A hardness of about 25 or less, preferably about 20 or less, more preferably about 15 or less, even more preferably about 10 or less, even more preferably about 5 or less and even more preferably about 1 or less. Desirably, the three dimensional polymeric network of thermoplastic polymer is present in amounts from about 20% to about 100%, preferably about 40% to about 100%, even more preferably about 60% to about 100%, and even more preferably about 90% to about 100% by weight of the filling material.

The final desired amount of thermoplastic polymer can depend partially on the kind of thermoplastic polymer selected and partially on the additives included. In any case, however, the amount of thermoplastic polymer must be sufficiently high that molecules of like or unlike polymer bond to form the three-dimensional network. The filling materials of the present invention differ substantially from conventional petroleum based material and a polymeric additive which do not embody a three-dimensional network. In such conventional filling materials, the ranges of additive amounts of polymeric material cannot form a three-dimensional network. Further, the filling material of the present invention desirably excludes fumed silica and other silica products often used with conventional petroleum based filling materials. However, superabsorbent materials such as hydrophilic polymers and other stabilizers often used with conventional petroleum based filling materials may be desirable.

Desirably, the filling material according to the present invention containing the three-dimensional network of thermoplastic polymer melts and flows at temperatures above about 80° C., preferably about 90° C. to about 125° C. This allows the polymer to be melted and introduced into a tube during cable manufacture. Further, the filling material containing the three-dimensional network maintains its three-dimensional characteristics at as high as about 80° C. to inhibit dripping, and is sufficiently soft at as low as about −50° C. to avoid undue optical performance degradation.

The thermoplastic polymers employed in the filling materials may include, but are not limited to, thermoplastic elastomers and rubbers that will form the three-dimensional network singly or in combination. Desirable thermoplastic elastomers include block copolymers having hard and soft polymeric units such as block copolymers of styrene and butadiene, block copolymers of styrene and isoprene, block copolymers of styrene and ethylene and/or butylene; and polyurethane elastomers and elastomeric alloys. Desirable thermoplastic rubbers include olefinic rubbers such as ethylene or propylene containing rubber, and other olefinic rubbers that can be plasticized sufficiently to achieve the desired softness.

In a preferred embodiment, the thermoplastic polymer employed is a block copolymer. Such copolymers are available from Shell Chemicals under the tradename KRATON™ polymers and compounds. KRATON™ polymers are high performance thermoplastic elastomers.

Certain KRATON™ block copolymers are particularly suitable for use with the present invention due to an unusual combination of softness and low viscosity for easy thermoplastic processing at elevated temperatures or in solution.

The KRATON™ block copolymers are available as linear, diblock, triblock and radial polymers. Each molecule of KRATON™ block copolymer includes block segments of styrene monomer units and rubber monomer units. The most common structures are the linear A-B-A block types: styrene-butadiene-styrene (SBS) and styrene-isoprene-styrene (SIS).

The desired thermoplastic polymers of the present invention include rigid end blocks and a soft middle block. For example, the A-B-A structure of the KRATON™ block copolymers has polystyrene endblocks and an elastomeric midblock. Prior to processing, the polystyrene endblocks are associated in rigid domains. Physical bonding via these domains yields a continuous three dimensional network. During processing, in the presence of heat and shear or solvent, the polystyrene domains soften and permit flow. After cooling or solvent evaporation, the polystyrene domains reform and harden, locking the threedimensional network in place. The physical bonding and reinforcing effect of the styrene domains provide strength, and the rubber midblock provides elasticity.

Of special interest are the KRATON™ G polymers. A particularly preferred block copolymer of the KRATON™ G series is a second generation polymer of the styrene-ethylene/butylene-styrene (SEBS) type. The polymers exhibit superior ozone resistance and can withstand prolonged outdoor exposure. Further, these polymers may be made, in accordance with the present invention with a sufficient softness such that they do not cause a large compressive strain on the optical fibers.

The thermoplastic filling materials of the present invention may include one or more additives to achieve superior appearance, performance and/or processing properties. These additives may include, but are not limited to plasticizers, lubricants, foaming agents, heat stabilizers, flame retardants, antioxidants, pigments, dyes and fillers. In certain embodiments, any one or more of the additives are excluded from the filling materials of the invention, yet in other embodiments, any one or more of the additives may be included.

Plasticizers are relatively nonvolatile liquids which are blended with polymers to alter their properties by intrusion between polymer chains. Plasticizers may be included within the filling material to improve processing and exterior characteristics, reduce melt viscosity, reduce the minimum required processing temperature, improve flexibility and reduce hardness. A suitable plasticizer acts to plasticize the soft elastic sections of the copolymer molecules but leaves the three-dimensional network intact.

Desirably, the thermoplastic filling materials of the present invention do not require plasticizer. However, useful amounts of plasticizer may be employed. The amount of plasticizer is preferably less than about 80%, more preferably less than about 60%, even more preferably less than about 40%, and even more preferably less than about 10% by weight based upon the total weight of the thermoplastic polymer or polymers employed.

Lubricants are materials which are incompatible with the thermoplastic polymer that are added to provide slip or release between the polymer and the buffer tube or optical fiber. Lubricants also prevent the polymers from sticking to the metallic surfaces of the processing equipment. Lubricants, unlike plasticizers, may possess a certain degree of chemical incompatibility or insolubility which causes them to be exudated to the surface of the polymer during processing and reducing the surface coefficient of friction. This surface modification results in easier processing, better extrusion and increased slip. Suitable lubricants may include, for example: low molecular weight polyethylene; oxidized polyethylene; low melt petroleum wax; mineral oil; vegetable oil; silicone oil; polyfluorocarbon powder; molybdenum disulfide; montanic acid; polyvinyl alcohol; various metallic stearates including calcium stearate and zinc stearate; steric acid; various hydrocarbons; fatty acids and alcohols, fatty acid esters such as glycerol monostearate, vegetable oils and carnauba wax; fatty amides such as oleamides, erucamides and bis-stearamides; and various polymers depending on the thermoplastic polymer employed in the filling material. Those skilled in the art will readily recognize suitable lubricants based upon their incompatibility with the polymer.

Desirably, the thermoplastic filling materials of the present invention do not require lubricant. However, useful amounts of the lubricant may be employed. The amount of lubricant is preferably less than about 5%, even more preferably less than about 3%, even more preferably less than about 2%, even more preferably less than 1% by weight of the thermoplastic polymer or polymers employed.

The filling material may be foamed by incorporating gas bubbles. Gas bubbles can be incorporated into the filling material in a number of ways. Nucleating agents can be used to create nucleation sites for the bubbles. In one embodiment, gas may be injected into the filling material under pressure from an outside source via suitable nozzles or the like. Thereafter, during an appropriate mixing operation (generally under pressure) a substantially homogeneous distribution of very small, compressed gas bubbles throughout the filling material occurs. During subsequent charging of this mixture into the interior of a tube, the filling material is injected via appropriate funnels or the like. Subsequently, the gas bubbles expand to their final, still relatively small size because of the reduction in pressure the filling material experiences when placed within the tube.

Another means of incorporating gas bubbles is by adding chemicals to the filling material which generate a gas when heated. Given an appropriately thorough mixing, it is assured that the gas bubbles are uniformly distributed throughout the entire filling material whereby the size of the gas bubbles is influenced or controlled by the pore size of the added material which generate the gas, by the temperature rise (or energy input) and by control of applied pressure. These chemical foaming agents (CFAs) are additives which produce a cellular structure in plastic products.

The CFAs can be added to the thermoplastic filling material in different ways. They can be preblended with the filling material, blended using a hopper blender, metered in at the feed throat, or pumped in the case of liquids. The CFAs are dispersed into the filling material as it is melted, then a decomposition reaction liberates a gas. There should be sufficient pressure to force the gas to dissolve into the melt. For proper cell formation, the gas must remain dissolved in the melt until its desired release. At that time, the gas expands out of solution and forms cells in the plastic. The plastic melt viscosity must be sufficient to maintain the cells, otherwise they will grow until they burst, resulting in collapsed or open celled foam.

Suitable CFAs may include azodicarbonamide, activated azodicarbonamide, modified azodicarbonamide, dinitrosopentamethylena tetramine, 4,4'-oxytals (benzenesulfonyl) hydrazine, 5-phenyltetrazole, p-toluenesulfonyl semicarbazinde, p-toluene sulfonyl hydrazide, 2,2'-azobisisobutyronitrile.

As an alternative or in addition to CFAs it may be expedient to add one or more fillers, for example, microspheres, particularly compressible microspheres, to the filling material. The microspheres can be composed of polyvinylidenechloride (for example, "EXPANCEL 551 DE" of the Expancel company). The use of hollow microspheres of polyacrylate is especially desirable (for example, "EXPANCEL 091 DE" of the Expancel company).

Many thermoplastic polymers cannot be processed without the use of heat stabilizers since typical processing temperatures cause degradation of those polymers. Thus, it may be desirable to include one or more heat stabilizers in the filling material. The following classes of heat stabilizers may be useful in the filling material of the present invention: barium-cadmium, organo-tin, calcium-zinc, lead, antimony mercaptides, epoxies and phosphites. Desirably, the amount of heat stabilizer is less than about 5%, even more preferably less than about 2%, even more preferably less than about 1% by weight based upon the total weight of the thermoplastic polymer or polymers employed.

For many environments, for example, riser applications, flame retardant compositions are necessary. Therefore, the filling material may include one or more flame retardants. Suitable flame retardants may include antimony oxide, organic halogens, molybdenum compounds, alumina trihydrate, boron compounds organic phosphates and inorganic halides.

Antioxidants retard the rate of oxidation throughout the useful life of the polymer. The following classes of antioxidants may be useful in the filling material of the present invention: hindered phenols, thiobisphenolics, aromatic amines, thioesters and phosphites. Desirably, the amount of antioxidant is less than about 5%, even more preferably less than about 2%, even more preferably less than about 1% by weight based upon the total weight of the thermoplastic polymer or polymers employed.

Useful pigments include any substance, desirably in the form of a dry powder that imparts a desired color to the filling material. Desirable pigments may include organic pigments such as benzimidazolones (yellow, red, orange), phthalocyanimes (blue, green), quinacsidones (violet, red, orange), dioxanes (violet), isoindolinones (yellow, red, orange), disazos (yellow, red), pyrazalones (orange, red), diarylides (yellow, orange), dianisidines (orange); inorganic pigments such as titanium dioxide (white), lead chromates (yellow, orange), iron oxides (brown, red, maroon, yellow, black), chromium oxide (green), cadmium sulfoselenides (maroon, red, orange), lithopone (white), ultramarine blue (aluminosilicate complex with sulfur), nickel titanate (yellow), cobalt aluminate (blue), zinc chromate (yellow), lead molybdate (orange), cadmium sulfide (orange); lake pigments; pearlescent colorants; and daylight fluorescent colorants. Desirably, the amount of pigment is less than about 5%, even more preferably less than about 3%, even more preferably less than about 2%, even more preferably less than about 1% by weight of the thermoplastic polymer or polymers employed.

Likewise, various dyes may be used to impart a desired color to the filling material. Suitable dyes may include azo dyes, diazodyes, pyrazolones, quinolones, quinophthalones, anthraquinones and nigrosines. Desirably, the amount of dye is less than about 5%, even more preferably less than about 3%, even more preferably less than about 2%, even more preferably less than about 1% by weight of the thermoplastic polymer and polymers employed.

Fillers may be used in the present invention, however, their absence is preferred. The filler or fillers employed will desirably reduce costs without adversely affecting the physical properties of the filling material or final cable.

The three-dimensional network of the filling materials of the present invention, with or without one or more of the above-described additives, allows for desirable connectorization, water blocking, excessive temperature performance and optical performance. The materials provide for clean removal because they are less oily/greasy. The materials provide excellent water resistance. The materials resist dripping at high temperatures, yet remain soft at low temperatures. The materials provide excellent resistance to excessive attenuation changes. Moreover, the materials are economical because the base materials are inexpensive, additives such as silica are not necessary and expensive blending is often unnecessary.

Encasing the filling material and optical fiber is a tube, for example, a buffer or core tube. The tubes of the present invention may be manufactured by methods and with materials known by those skilled in the art. Selection of materials used will depend on the specific filling material employed. Generally, the filling material cannot possess properties which when in contact with the tube deteriorate the tube.

The optical fiber and the filling material may be inserted in the tube according to methods known by those skilled in the art. For example, the optical fibers may be advanced through a guide and a chamber, which resembles a tube and a die cavity in a conventional crosshead extruder. The space to be filled with the filling material is substantially filled and then the tube is extruded thereover. Such processes are described in more detail in, for example, Gartside III et al, U.S. Pat. No. 4,826,278; Greveling, U.S. Pat. No. 4,763,982; Taylor et al, U.S. Pat. No. 4,776,910; and Arroyo, U.S. Pat. No. 4,730,894, the contents of each of which are incorporated by reference herein.

Alternatively, the optical fiber and the filling material may be inserted within a premanufactured tube by longitudinally cutting the tube, separating the cut edges to form a gap, inserting the filling material into the tube through the gap and uniting the edges. Such processes are described in more detail in, for example, Portinari et al, U.S. Pat. No. 4,279,470, the contents of which are incorporated by reference herein. The filling material of the present invention is particularly suitable for use in this process since it is better confined to the tube and will avoid dripping.

FIGS. 2–3 are a perspective view and a cross-sectional view, respectively, of one of the embodiments of the present invention. As shown, there are three bundles 15 of optical fibers embedded within a filling material 20 according to the present invention. While shown as three bundles of optical fibers, numerous other constructions are contemplated. For example, embedding a single optical fiber, optical fiber ribbons, a single bundle or multiple optical fibers separately dispersed in the filling material are contemplated. Regardless of the construction, however, the filling material substantially occupies the space between the optical fibers and a core tube 25. Further, it should be understood that the optical fibers are desirably undulated along portions of the core tube 25 in a manner which causes each of the optical fibers to have a length which is greater than the length of the core tube 25.

This will prevent undue strain from being imparted to the optical fibers during manufacture, installation and service of the cable.

Surrounding the core tube 25 is a sheath system which is designated generally by the numeral 30. The sheath system may include one or more strength members 35, a tape 40 and an outer plastic jacket 45. Generally, the strength members 35 may be made of any of a number of conventionally used strength members. Likewise, the tape 40 may be made of any of a number of conventionally used tapes which prevent the adhesion of the jacket 45 to the core tube 25. The plastic jacket 45 may be made of any conventionally used material such as polyethylene. A rip cord 50 may be included to facilitate jacket removal.

Sheath systems according to the one described in FIGS. 2–3 are known in the art. The methods of manufacture and materials employed in making the sheath is described by, for example, Kinard et al., U.S. Pat. No. 4,844,575, the contents of which are hereby incorporated by reference herein.

Figure 5:
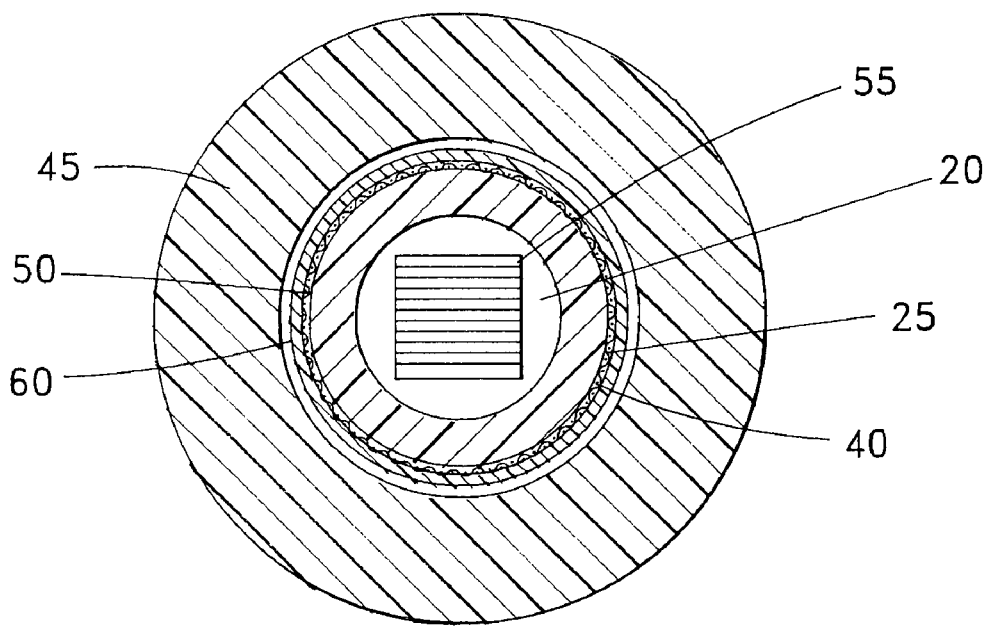
FIG. 5 is a cross-sectional view of a communication cable according to FIG. 4.

FIGS. 4–5 are a perspective view and a cross-sectional view, respectively, of another of the embodiments of the invention. As shown, there is a stack of optical fiber ribbons 55 embedded within a filling material 20. The stack of optical fiber ribbons can be undulated and/or stranded along portions of the core tube 25 in a manner that causes each of the optical fibers to have a length which is greater than the length of the core tube 25.

Surrounding the core tube 25 is a sheath system which is designated generally by the numeral 30. The sheath system may include a tape 40, one or more strength members 60 and an outer plastic jacket 45. Generally, the tape 40 and the plastic jacket 45 and ripcord 50 are similar to those described in the embodiment of FIGS. 2–3. The strength members 60, however, differ in that they are arranged in a helical wrapped fashion covering the outer area of the tube 25 and tape 40. Such strength members are well-known in the art and may be made of a diverse number of materials. See, for example, Arroyo et al., U.S. Pat. No. 4,818,060, the contents of which is hereby incorporated by reference herein.

Sheath systems according to the one described in FIGS. 4–5 are known in the art. The methods of manufacture and materials employed in making the sheath is described in, for example, Arroyo et al., U.S. Pat. No. 4,818,060, the contents of which are hereby incorporated by reference hereinabove.

Figure 6:
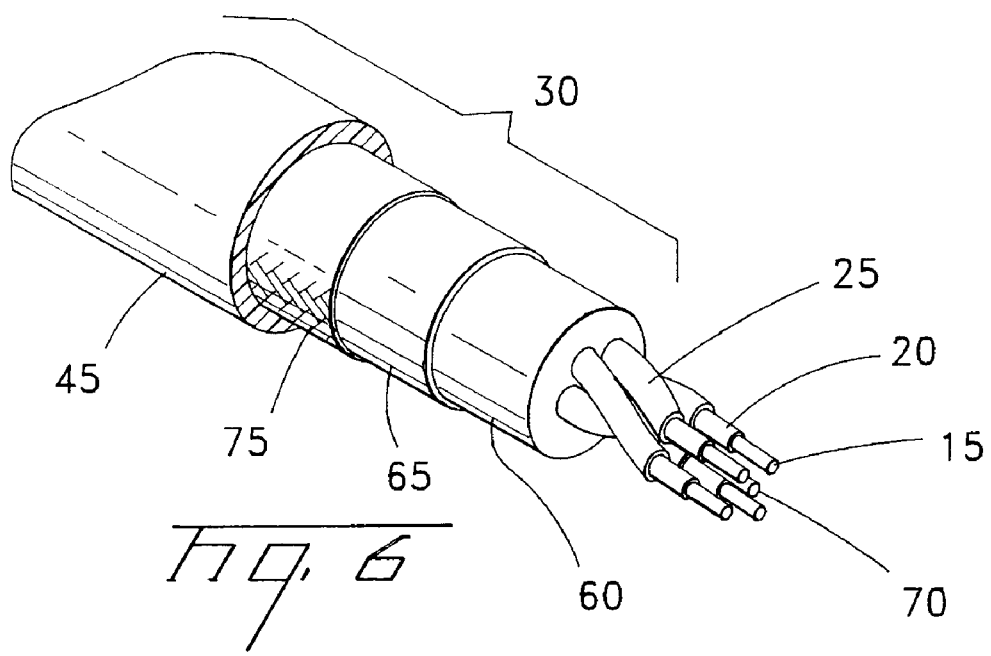
FIG. 6 is a perspective view of a communication cable according to yet another embodiment of the invention.
Figure 7:
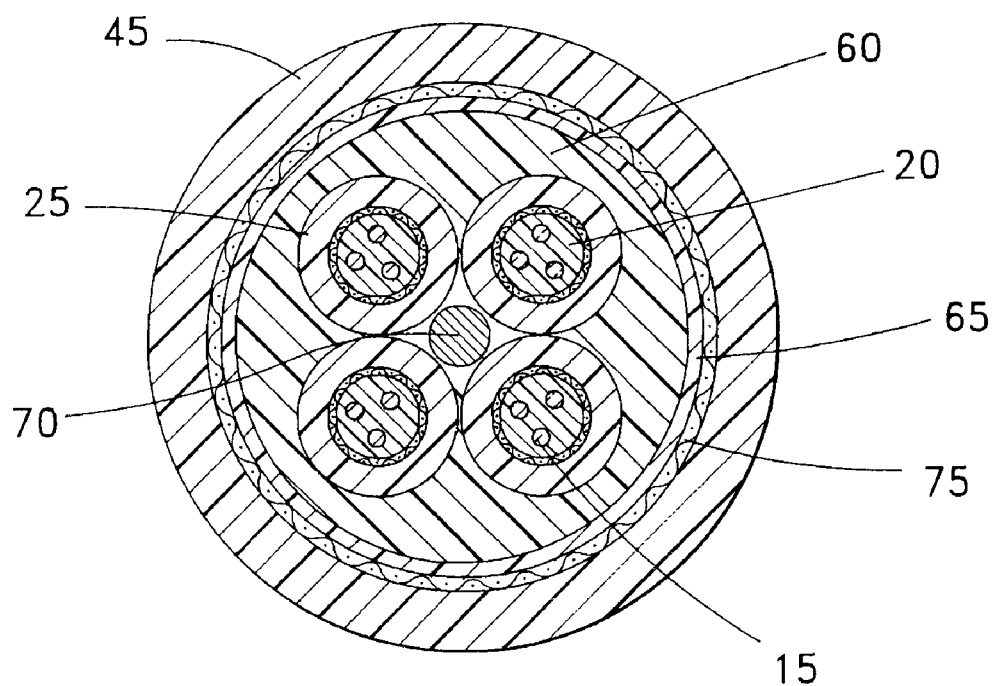
FIG. 7 is a cross-sectional view of a communication cable according to FIG. 6.

FIGS. 6–7 are a perspective view and a cross-sectional view, respectively, of yet another of the embodiments of the invention. As shown, there are four tubes 25 each containing three bundles 15 of optical fibers embedded within a filling material 20. Each of the buffer tubes 25 is helically wrapped around a central strength member 70 which may be made of glass or aramid fiber yarn. As in FIGS. 2–3, numerous other constructions are contemplated. For example, a single optical fiber, a single bundle or multiple optical fibers separately dispersed in the filling material are contemplated for each tube. Regardless of the construction, however, the filling material 20 at least partially occupies the space between the optical fibers and the tubes 25.

Surrounding the tubes 25 is a sheath system which is designated generally by the numeral 30. The sheath system differs significantly from the abovedescribed sheath systems in that it includes a flooding material 60. Surrounding the flooding material 60 is a core wrap 65, strength member yarn 75 and a jacket 45. The core wrap 65, strength member yarn 75 and jacket 45 may be made of conventionally used materials.

The flooding material 60 and the central strength member 70 occupy the space between the tubes 25 and the core wrap 65. Flooding compounds 60 are well-known in the art and should not be confused with the filling materials 20 of the present invention. The filling material 20 of the invention is found within the tubes whereas the flooding compounds are outside of the tubes. As a result of the differences in the proximity/contact of the filling compounds and the flooding compounds to the optical fiber, the materials used for each generally differ. However, it is contemplated herein that certain filling materials will likewise be useful as a flooding compound.

Sheath systems according to the one described in FIGS. 6–7 are known in the art. The methods of manufacture and materials employed in making the sheath is described in, for example, Arroyo et al. U.S. Pat. No. 4,818,060.

It is to be understood that the above-described embodiments are simply illustrative of the invention. Other arrangements may be devised by those skilled in the art which will embody the principles of the invention and fall within the spirit and scope thereof.

What is claimed is:

1. A fiber optic cable comprising: a cable jacket surrounding at least one non tight-buffered optical fiber within a core or buffer tube, a space between the optical fiber and the tube and a thermoplastic filling material at least partially filling said space and contacting said optical fiber, wherein said thermoplastic filling material comprises: (i) about 20% to about 100% by weight of thermoplastic polymeric molecules which have bonded to form a three dimensional network substantially throughout said thermoplastic filling material; and (ii) about 0% to about 80% of an additive or additives that do not cause undesirable optical performance.

2. The cable according to claim 1, wherein said thermoplastic filling material possesses a Shore A hardness of about 25 or less.

3. The cable according to claim 2, wherein said thermoplastic filling material possesses a Shore A hardness of about 5 or less.

4. The cable according to claim 1, wherein said thermoplastic filling material possesses a melt flow at temperatures over about 80° C.

5. The cable according to claim 4, wherein said thermoplastic filling material possesses a melt flow at a temperature between about 90° C. and about 125° C.

6. The cable according to claim 1, wherein said thermoplastic filling material does not possess a melt flow at temperatures of about 80° C. or less.

7. The cable according to claim 1, wherein said thermoplastic filling material is soft rubber texture within a temperature range of from about −50° C. to about 80° C.

8. The cable according to claim 1, wherein said thermoplastic filling material comprises at least about 40% by weight of said three dimensional polymeric network of said bonded thermoplastic polymeric molecules.

9. The cable according to claim 8, wherein said thermoplastic filling material comprises at least about 60% by weight of said three dimensional polymeric network of said bonded thermoplastic polymeric molecules.

10. The cable according to claim 9, wherein said thermoplastic filling material comprises at least about 80% by weight of said three dimensional polymeric network of said bonded thermoplastic polymeric molecules.

11. The cable according to claim 1, wherein said thermoplastic polymeric molecules are thermoplastic elastomers.

12. The cable according to claim 11, wherein said thermoplastic elastomers are block copolymers.

13. The cable according to claim 12, wherein said block copolymers are selected from the group consisting of copolymers of styrene and butadiene, styrene and isoprene, styrene and ethylene, styrene and butylene, styrene and ethylene and butylene.

14. The cable according to claim 13, wherein said block copolymer contains styrene end blocks.

15. The cable according to claim 14, wherein said block copolymer is a styrene-ethylene/butylene-styrene block copolymer.

16. The cable according to claim 11, wherein said thermoplastic elastomers are polyurethane elastomers or elastomeric alloys.

17. The cable according to claim 1, wherein said thermoplastic polymeric molecules are thermoplastic rubbers.

18. The cable according to claim 17, wherein said thermoplastic rubber is an olefinic rubber.

19. The cable according to claim 18, wherein said olefinic rubber is an ethylene or propylene containing rubber.

20. The cable according to claim 1, wherein said three-dimensional network comprises polymeric molecules with rigid domains which soften with the application of heat and harden thereby locking the three dimensional network in place when heat is removed.

21. The cable according to claim 1, wherein said one or more additives is selected from the group consisting of plasticizers, lubricants, foaming agents, heat stabilizers, flame retardants, antioxidant pigments, dyes and fillers.

22. The cable according to claim 21, wherein said one or more additives is a plasticizer.

23. The cable according to claim 22, wherein said plasticizer is present in an amount less than about 80% by weight based upon the thermoplastic filling material.

24. The cable according to claim 23, wherein said plasticizer is present in an amount less than about 10% by weight based upon the thermoplastic filling material.

25. The cable according to claim 1, wherein said additive is a foaming agent.

26. The cable according to claim 1, wherein said thermoplastic filling material comprises gas bubbles dispersed throughout the three dimensional network forming a foam.

27. The cable according to claim 26, wherein said foam is generated through mechanical or chemical means.

28. The cable according to claim 26, wherein said foam is generated with chemical foaming agents.

29. The cable according to claim 1, wherein said thermoplastic filling material contains no petroleum based oils, waxes or greases.

30. The cable according to claim 1, wherein said thermoplastic filling material contains no silica.

31. A fiber optic cable comprising: a cable jacket surrounding at least one non tight-buffered optical fiber within a core or buffer tube, a space between the optical fiber and the tube, and a thermoplastic filling material at least partially filling said space and contacting said optical fiber; wherein said thermoplastic filling material comprises: (i) about 20% to about 100% by weight of thermoplastic polymeric molecules which have bonded to form a three dimensional network substantially throughout said thermoplastic filling material; and (ii) about 0% to about 80% of an additive or additives that do not cause undesirable optical performance, and said thermoplastic filling material possesses a Shore A hardness of about 5 or less, a melt flow at temperatures over about 80° C. and does not possess a melt flow at any temperature below about 80° C.

32. The cable according to claim 31, wherein said thermoplastic filling material comprises at least about 80% by weight of said three dimensional polymeric network of said bonded thermoplastic polymeric molecules.

33. A fiber optic cable comprising at least one non tight-buffered optical fiber within a tube, a space between the optical fiber and the tube, and a thermoplastic filling material at least partially filling said space and contacting said optical fiber, wherein said thermoplastic filling material comprises: (i) a thermoplastic block copolymer of styrene-ethylene/butadiene-styrene molecules which have bonded to form a three dimensional network substantially throughout said thermoplastic filling material, said block copolymer is present in an amount of about 20% to about 100% by weight based upon said thermoplastic filling material, and (ii) about 0% to 80% of an additive or additives that do not cause undesirable optical performance, and said thermoplastic filling material possesses a Shore A hardness of about 5 or less.

34. A fiber optic cable comprising: at least one optical fiber within a tube, a space between the optical fiber and the tube and a thermoplastic material at least partially filling said space for water-blocking within said tube, said thermoplastic material excludes inorganic hollow microspheres and comprises: (i) about 20% to about 100% by weight of thermoplastic polymeric molecules forming a three dimensional network substantially throughout said thermoplastic material; and (ii) about 5% or less by weight of a lubricant or lubricants.

35. The cable according to claim 34, wherein said thermoplastic material possesses a Shore A hardness of about 25 or less.

36. The cable according to claim 34, wherein said thermoplastic material possesses a melt flow at temperatures over about 80° C.

37. The cable according to claim 36, wherein said thermoplastic material possesses a melt flow at a temperature between about 90° C. and about 125° C.

38. The cable according to claim 34, wherein said thermoplastic material does not possess a melt flow at temperatures of about 80° C. or less.

39. The cable according to claim 34, wherein said thermoplastic material is soft rubber texture within a temperature range of from about −50° C. to about 80° C.

40. The cable according to claim 34, wherein said thermoplastic material comprises at least about 40% by weight of said three dimensional polymeric network of said bonded thermoplastic polymeric molecules.

41. The cable according to claim 40, wherein said thermoplastic material comprises at least about 80% by weight of said three dimensional polymeric network of said bonded thermoplastic polymeric molecules.

42. The cable according to claim 34, wherein said thermoplastic polymeric molecules are thermoplastic elastomers.

43. The cable according to claim 42, wherein said thermoplastic elastomers are block copolymers.

44. The cable according to claim 43, wherein said block copolymers are selected from the group consisting of copolymers of styrene and butadiene, styrene and isoprene, styrene and ethylene, styrene and butylene, styrene and ethylene and butylene.

45. The cable according to claim 44, wherein said block copolymer contains styrene end blocks.

46. The cable according to claim 45, wherein said block copolymer is a styrene-ethylene/butylene-styrene block copolymer.

47. The cable according to claim 42, wherein said thermoplastic elastomers are polyurethane elastomers or elastomeric alloys.

48. The cable according to claim 34, wherein said thermoplastic polymeric molecules are thermoplastic rubbers.

49. The cable according to claim 48, wherein said thermoplastic rubber is an olefinic rubber.

50. The cable according to claim 49, wherein said olefinic rubber is an ethylene or propylene containing rubber.

51. The cable according to claim 34, wherein said thermoplastic material includes one or more additives.

52. The cable according to claim 51, wherein said one or more additives is selected from the group consisting of plasticizers, foaming agents, heat stabilizers, flame retardants, antioxidant pigments, dyes and fillers.

53. The cable according to claim 34, wherein said thermoplastic material contains no petroleum based oils, waxes or greases.

54. The cable according to claim 34, wherein said thermoplastic material contains no silica.

55. A fiber optic cable comprising: at least one optical fiber within a tube, a space between the optical fiber and the tube, and a thermoplastic material at least partially filling said space for water-blocking within said tube, said thermoplastic material excludes inorganic hollow microspheres and comprises: (i) a block copolymer, comprising about 20% to about 97% by weight, selected from the group consisting of copolymers of styrene and butadiene, styrene and isoprene, styrene and ethylene, styrene and butylene, styrene and ethylene and butylene, forming a three dimensional network substantially throughout said thermoplastic material; and (ii) about 3% or more by weight of a plasticizer.

56. The cable according to claim 55, wherein said thermoplastic material possesses a Shore A hardness of about 25 or less.

57. The cable according to claim 55, wherein said thermoplastic material comprises at least about 20% by weight of said block copolymer.

58. The cable according to claim 57, wherein said thermoplastic material comprises at least about 40% by weight of said block copolymer.

59. The cable according to claim 58, wherein said thermoplastic material comprises at least about 80% by weight of said block copolymer.

60. The cable according to claim 55, wherein said block copolymer contains styrene end blocks.

61. The cable according to claim 60, wherein said block copolymer is a styrene-ethylene/butylene-styrene block copolymer.

62. The cable according to claim 55, wherein said thermoplastic material includes one or more additives.

63. The cable according to claim 62, wherein said one or more additives is selected from the group consisting of lubricants, foaming agents, heat stabilizers, flame retardants, antioxidant pigments, dyes and fillers.

64. The cable according to claim 55, wherein said plasticizer is present in an amount less than about 80% by weight based upon the thermoplastic material.

65. The cable according to claim 64, wherein said plasticizer is present in an amount less than about 40% by weight based upon the thermoplastic material.

66. The cable according to claim 65, wherein said plasticizer is present in an amount less than about 10% by weight based upon the thermoplastic material.

67. The cable according to claim 55, wherein said thermoplastic material contains no petroleum based oils, waxes or greases.

68. The cable according to claim 55, wherein said thermoplastic material contains no silica.

* * * * *